B. FRANKENFIELD.
FREQUENCY RESPONSIVE DEVICE.
APPLICATION FILED MAR. 12, 1910.

1,029,007.

Patented June 11, 1912.

Witnesses
John L. Johnson
Chas. L. Byron

Inventor
Budd Frankenfield
By Chas. E. Lord
Attorney

UNITED STATES PATENT OFFICE.

BUDD FRANKENFIELD, OF LOS ANGELES, CALIFORNIA, ASSIGNOR TO ALLIS-CHALMERS COMPANY, A CORPORATION OF NEW JERSEY.

FREQUENCY-RESPONSIVE DEVICE.

1,029,007.   Specification of Letters Patent.   Patented June 11, 1912.

Application filed March 12, 1910. Serial No. 548,992.

*To all whom it may concern:*

Be it known that I, BUDD FRANKENFIELD, a citizen of the United States, residing at Los Angeles, in the county of Los Angeles and State of California, have invented certain new and useful Improvements in Frequency-Responsive Devices, of which the following is a full, clear, and exact specification.

My invention relates to frequency-responsive devices.

It is often desirable to have some means which is responsive to the frequency in an alternating current circuit—means which will operate in one direction when the frequency is below a predetermined normal value and in the other when the frequency is above such normal value.

It is the object of my invention to provide such means. In attaining this object there are provided two relatively movable windings, which for convenience may be called armature and field windings, and these windings are supplied from the circuit to the frequency in which it is desired that the device be responsive. The fluxes due to the currents in the two windings are caused to be displaced from each other both in time and space by angles which at normal frequency are such that no torque is produced. When the frequency rises above or falls below normal, the time-displacement between the armature and field fluxes is varied, preferably by the same means which produces such time-displacement, and in consequence a torque is developed and relative movement between the armature and field windings produced in one direction or the other according as the time-displacement has been increased or decreased.

The various novel features of my invention will be apparent from the description and drawings, and will be particularly pointed out in the claims.

Figure 1:
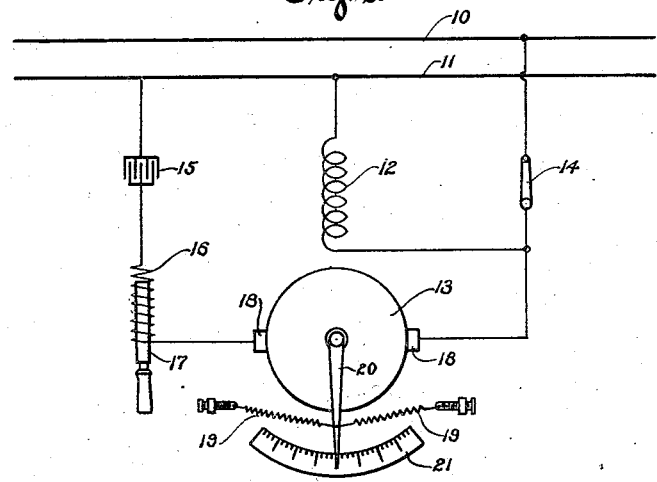
Figure 2:
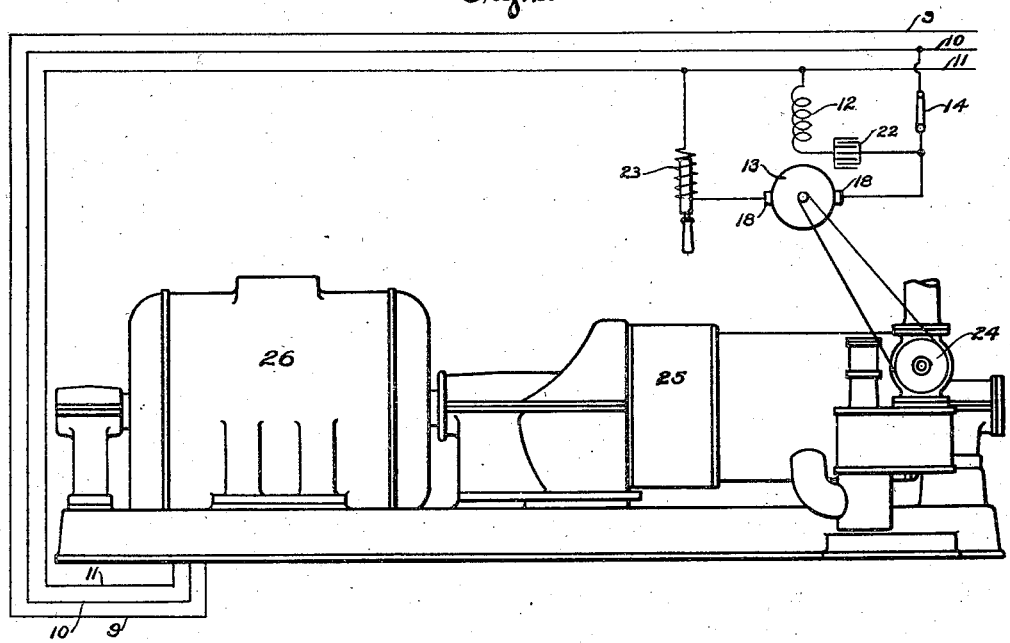

Figure 1 shows diagrammatically one form of my frequency-responsive device; Fig. 2 shows a somewhat modified form of my frequency-responsive device arranged to control the supply of steam to a turbine driving a generator which supplies the circuit to the frequency in which the device is responsive.

In the arrangement shown in Fig. 1, an alternating current circuit 10—11 supplies a field winding 12 and an armature 13, preferably through a disconnecting switch 14. In the circuit of the armature 13 is placed a condenser 15 and an inductance coil 16, the latter being preferably adjustable as by means of the movable core 17. Here the armature is of the commutator type, the magnetic poles of the armature being maintained normally fixed in space, save for reversals, by means of the adjustable brushes 18.

The current in the field winding 12, and consequently the field flux, are substantially in time-quadrature with the voltage on the mains 10—11. The inductance of the coil 16 is so adjusted that the circuit including such coil, the condenser 15, and the armature 13 is tuned for normal frequency, so that the armature current and flux are substantially in phase with the voltage on the circuit 10—11 when the frequency is normal. The field and armature fluxes are thus in time-quadrature. By reason of the arrangement of the brushes 18, they are also in space-quadrature. Consequently, while the frequency in the circuit 10—11 remains at its normal value, there is no torque developed tending to cause relative motion between the field member 12 and the armature 13. If the frequency in the circuit 10—11 rises above or falls below such normal value, the current in the armature circuit becomes either lagging or leading, and the armature flux gets out of time-quadrature with the field flux. But as the armature flux remains in space-quadrature with the field flux, there is a tendency for the armature to move relatively to the field member in one direction or the other according as the armature current is lagging or leading. If the armature is free to turn, the resultant rotation of the armature may be used to operate a governor or a regulator of any desired type. If the motion of the armature is limited, it may be used to control relay circuits to obtain any desired results; or the armature may be mounted to operate against a spring or springs 19 so that the extent of movement of the armature is a function of the phase-displacement between the armature flux and the frequency in the circuit 10—11. In this latter case the movement of the armature is a function of the departure from normal of the frequency in the circuit 10—11, and visual indication of the frequency may be obtained by mounting a pointer 20 on the shaft of the armature 13 so that it will swing over a suitable scale 21. Exact tuning of the armature circuit is not necessary, as any lack of time-quadrature between the field and armature fluxes may be balanced by shifting the brushes 18, it being only necessary to have the space-displacement and the time-displacement of the fluxes so related at normal frequency that no torque is developed.

In Fig. 2 is shown a modification of my frequency responsive device arranged to control the admission of steam to a turbine. Here the frequency-responsive device, as in the arrangement shown in Fig. 1, consists of the field member 12 and the armature 13, the circuits of both being controlled by the switch 14. A condenser 22 is placed in circuit with the field member 12, and is preferably so proportioned that at normal frequency the condensive reactance and the inductive reactance of the field circuit just balance, thus making this circuit a tuned circuit. Thus the field flux in this arrangement is substantially in phase with the voltage across the mains 10 and 11 of the three phase circuit 9—10—11. The current in the armature 13 is made to lag 90° behind the voltage of the mains 10 and 11. The inductive reactance of the armature itself will often be sufficient to produce this lagging current, but if desired an inductance coil 23, which is preferably adjustable, may be placed in the armature circuit to insure quadrature. As in the arrangement shown in Fig. 1, the field and armature fluxes are thus in time-quadrature when the frequency in the circuit 9—10—11 is normal; they are maintained in space-quadrature at all times by the brushes 18. The time-displacement between the two fluxes may be adjusted by means of the movable core of the inductance coil 23, while the space-displacement between such fluxes may be regulated by shifting the brushes. Any inaccuracy in the adjustment of either of these displacements may be compensated for by adjusting the other so that the angles of time and space displacement between the two fluxes are such that no torque is developed. The armature 13 is connected in any desired manner to the valve 24 through which steam is admitted to a turbine 25 driving the three phase generator 26 which supplies the circuit 9—10—11. When the frequency in this circuit rises above normal, the time-displacement between the field and armature fluxes of the frequency-responsive device becomes less than 90° and the armature 13 rotates to close the valve 24 to diminish the supply of steam to the turbine 25. When the frequency in this circuit falls below normal, the time-displacement between the field and armature fluxes of the frequency-responsive device becomes greater than 90° and the armature 13 rotates in the opposite direction to open the valve 24 to increase the supply of steam to the turbine 25. In either case the movement of the armature 13 and valve 24 ceases as soon as the frequency in the circuit 9—10—11 is restored to normal value.

Whatever the angle of time-displacement between the armature and field fluxes may be, and such time-displacement may be anything desired, the angle of space-displacement between the two fluxes is made of proper value relative to that of time-displacement for normal frequency by connecting the armature winding to the outside circuit at the proper points. This connection of the armature winding need not be through a commutator and brushes as is illustrated in Figs. 1 and 2, for if the armature has only a small movement the connection of the circuit to the armature may be permanent. When the sum of the time and space displacements of the armature and field fluxes becomes such that the no-torque value no longer exists, as is the case whenever there is either an increase in the inductive reactance because of an increase in frequency or an increase in the condensive reactance because of a decrease in frequency, the armature tends to move relatively to the field in one direction or the other.

In the foregoing description the terms "armature winding" and "field winding" have been used for convenience. But the two windings may be precisely alike if desired, and either or both may be mounted for movement. It is only necessary, in a broad aspect of my invention, that the two windings be relatively movable and be supplied from the same circuit, that the time-displacement between the two fluxes developed vary when the frequency varies, and that the sum of the time and space displacements of the two fluxes be such for normal frequency that there is no torque developed between the two fluxes. Consequently, in actual construction the absence of torque may be obtained when the two angles of time and space displacement are not supplementary. The term "same circuit" as used above and in the claims is intended to cover alternating current circuits of all kinds, whether single phase or polyphase.

Many modifications may be made in the precise arrangements shown and described, and all such which do not depart from the spirit and scope of my invention I aim to cover in the following claims.

What I claim as new is:

1. In a frequency-responsive device, a field member having a single winding arranged to be connected to a circuit, a relatively movable armature having a single winding arranged to be connected to the same circuit and to produce a flux interacting upon and displaced in space from that produced by the field winding, and means associated with said windings for causing the time-displacement between the two fluxes to be such at normal frequency that no torque is produced between the armature and the field member, and for varying the time-displacement between the armature and field fluxes to produce such a torque upon a change in the frequency in the circuit.

2. In a frequency-responsive device, a field winding arranged to be connected to a circuit, a relatively movable armature having a commutator and brushes and arranged to be connected to the same circuit, the brushes being so located on the commutator that the fluxes produced by the currents in the armature and field windings are displaced in space, and means associated with said windings for causing said fluxes to be displaced in time by an angle which is dependent upon the frequency in the circuit to which the windings are connected and which at normal frequency is such that no torque is produced between the armature and field fluxes.

3. In a frequency-responsive device, a field winding arranged to be connected to a circuit, a relatively movable armature having a commutator and brushes and arranged to be connected to the same circuit, the brushes being so located that the armature and field fluxes are substantially in space-quadrature, and means for causing the armature and field fluxes to be in time-quadrature upon normal frequency in the circuit so that no torque is produced between the armature and field, and for varying the time-displacement between the two fluxes upon a change in frequency so that a torque is produced.

4. In a frequency-responsive device, a field winding arranged to be connected to a circuit, a relatively movable armature having a commutator and brushes and arranged to be connected to the same circuit, the brushes being so located on the commutator that the armature and field fluxes are substantially in space-quadrature, and a condenser which is so connected that the armature and field fluxes are substantially in time-quadrature for normal frequency in the circuit so that no torque is produced.

5. In combination, a field winding, a relatively movable armature winding, a commutator for said armature winding, brushes coöperating with said commutator and arranged on the commutator so that the fluxes produced by the armature and field windings are displaced in space, and means associated with said windings for causing the torque produced between them when they are connected to the same circuit to be in opposite directions according as the frequency in said circuit is above or below a predetermined value.

Milwaukee, Wis., Feb. 24, 1910.

In testimony whereof I affix my signature, in the presence of two witnesses.

BUDD FRANKENFIELD.

Witnesses:
C. E. FISH,
J. S. HANNA.